United States Patent [19]

Brass et al.

[11] Patent Number: 4,754,127

[45] Date of Patent: Jun. 28, 1988

[54] METHOD AND APPARATUS FOR TRANSFORMING DIGITALLY ENCODED DATA INTO PRINTED DATA STRIPS

[75] Inventors: Robert L. Brass, Westport; John Glaberson, Stratford; Richard W. Mason, Cos Cob; Scott Santulli, Danbury; G. Thomas Roth, Fairfield; William M. Feero, Waterbury; Richard K. Balaska, Jr., Trumbull, all of Conn.

[73] Assignee: Cauzin Systems, Incorporated, Waterbury, Conn.

[21] Appl. No.: 47,681

[22] Filed: May 8, 1987

Related U.S. Application Data

[63] Continuation of Ser. No. 798,312, Nov. 15, 1985, abandoned.

[51] Int. Cl.[4] .............................................. G06K 7/00
[52] U.S. Cl. ................................................... 235/456
[58] Field of Search ................ 235/456; 364/200, 900

[56] References Cited

U.S. PATENT DOCUMENTS

| | | | |
|---|---|---|---|
| 4,132,352 | 1/1979 | Salberta | 235/456 |
| 4,149,670 | 4/1979 | Axelrod | 235/456 |
| 4,172,553 | 10/1979 | Feather et al. | 235/456 |
| 4,237,375 | 12/1980 | Granholm | 235/456 |

Primary Examiner—Gareth D. Shaw
Assistant Examiner—John G. Mills
Attorney, Agent, or Firm—Haynes N. Johnson

[57] ABSTRACT

A data strip (2) of predetermined size is made (a) by determining the total nibbles of digital information to be encoded and the maximum number of integral nibbles per data line (14), using predetermined minimum dibit dimensions, after allowing for parity checks, alignment guides (32,36), and a start line (28), (b) by increasing the dibit dimensions to achieve the predetermined size, and adjusting the bit size to account for ink spread, and (c) by preparing a reader instruction header (16) containing coded specifications as to the data strip format. These factors are interdependent and must be correlated to provide a final data strip (2) satisfying all the predetermined criteria.

An associated printer (64) prints the data strip (2) with a header (16) and a data portion (12) in the determined format. The printer (64) may be a dot matrix printer which prints a data strip having the full width of the printer, which is then reduced photographically to increase the accuracy of the final data strip (2); or a laser or dot matrix printer can be used to print in the finished size.

10 Claims, 3 Drawing Sheets

METHOD AND APPARATUS FOR TRANSFORMING DIGITALLY ENCODED DATA INTO PRINTED DATA STRIPS

This is a continuation of Ser. No. 798,312, filed on Nov. 15, 1985, now abandoned.

FIELD OF THE INVENTION

This invention relates to the field of computer-readable information, either data or programs, which is printed upon a substrate such as paper. In particular, it relates to the method and apparatus for transforming digitally-encoded data into printed data strips, which strips include both the encoded information and encoded instructions for reading it.

BACKGROUND OF THE INVENTION

Data strips are printed forms which include encoded digital information to be read by a standardized optical reader and instructions, specific to that data strip, for the operation of the reader, which instructions are read by, and control, the reader.

The data strip includes a header which incorporates the reading instructions and an information portion which contains the encoded information to be read. The information portion is made up of a plurality of data lines carrying serially-encoded information. The lines are printed side by side and contiguous with one another. As a result, the totality of the widths of the data lines, together with the header, define the length of the data strip. Each data line includes a uniform number of integral nibbles (half bytes) of information in dibit form. The data line should also include "Start" and alignment indicia (to aid the optical reader in maintaining its alignment with the data lines) and parity checks for the dibits. The total length of the data lines defines the width of the data strip.

Due to the small size of the dibits used, the strip must be prepared with great accuracy in format and allow for differences in printing methods.

The data strip must also include specific instructions, relating to that particular strip, to be used by, and control, the optical reader. Accordingly, the information portion is preceded by the header.

Our invention provides a method and apparatus capable of (a) correlating all of the interdependent factors involved in preparing a readable printed data strip which contains the required amount of encoded data and (b) preparing such strip.

BRIEF SUMMARY OF THE DISCLOSURE

In order to convert digitally-encoded information into data strips, it is not sufficient simply to copy the information onto data lines serially and assemble the lines serially into a data strip. Rather, it is preferable, for greatest accuracy, to break the information into integral nibbles (half bytes) and have the same number of nibbles on each of the data lines forming the strip. Further, since the resulting strip must fall within predetermined dimensional parameters, i.e., the desired length and width of the final data strip, the width and height of the printed bits may have to be varied from strip to strip.

As a result, the information to be printed on the data strip should be uniquely formatted for each new strip, and printed accordingly. Thus, each data line will include nibbles (in dibit form) carrying the encoded information, dual parity checks, alignment indicia, and start bits. The totality of alignment indicia bits and start bits form lines running longitudinally of the data strip; these serve to provide control information for the optical reader. Header information, specific to that data strip, must be prepared which can convey correct and adequate format information to the optical reader for its internal use.

To accomplish this, we have invented a method and apparatus for transforming data stored in a digital memory into data strips. These data strips have a data portion formed of a plurality of adjacent data lines made up of a uniform number of linear, printed integral nibbles in which the previously-stored data has been encoded, control information, such as parity checks, and a header containing coded instructions to be used by, and control, the optical reader when it is reading (scanning) the portions of the strip carrying encoded data. This apparatus includes means for receiving information as to desired minimum dibit dimensions, length and width of the data strip, the previously stored data, and printing factors (ink spread index), and means for thereafter formatting and preparing the desired data strip.

The data strip format is established, using software if desired, (a) by determining the total number of nibbles of digital information that are to be encoded and the maximum number of integral nibbles per data line, using the specified minimum dibit dimensions, after allowing space for a double parity check, alignment guidelines, and a start line, (c) changing the dibit dimensions to achieve the predetermined data strip size, (d) adjusting the bit size to account for ink spread, and (e) preparing a header containing coded specifications as to the format chosen, for instructing the optical reader. As can be seen, these are interdependent and must be correlated to provide a final data strip meeting the desired criteria.

An associated printer then prints the data strip with a header and data portion in the determined format. The presently preferred printer is a dot matrix printer which prints out an enlarged data strip (having the full width of the printer). This printout is then reduced photographically to a much smaller finished data strip, one having the originally predetermined size. By first printing the strip in a larger size and then reducing it, the accuracy of the shapes of the bits in the final data strip is enhanced.

DETAILED DESCRIPTION OF THE DRAWINGS

FIG. 1 shows a data strip printed along the edge of a piece of paper, a typical location for use of data strips. The remainder of the paper may be used for related correspondence, contain normal printed matter or additional data strips, or the like.

Figure 5:
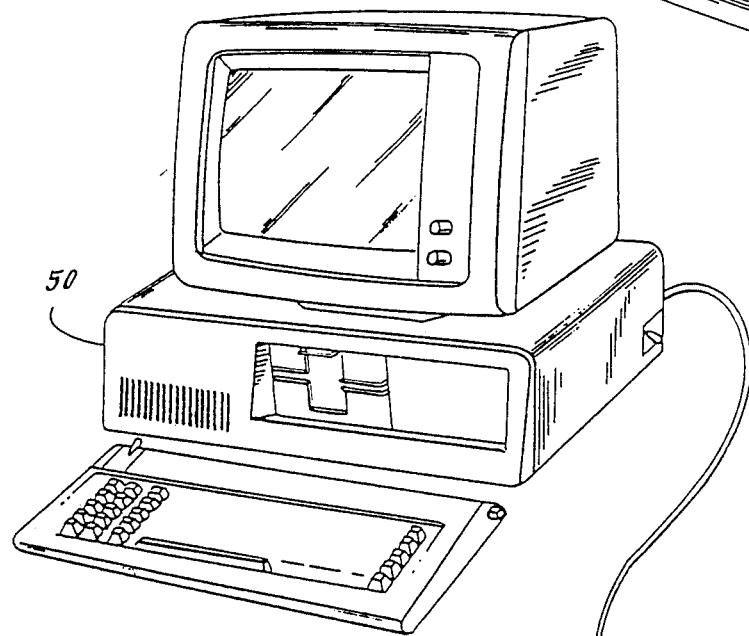
Figure 5:
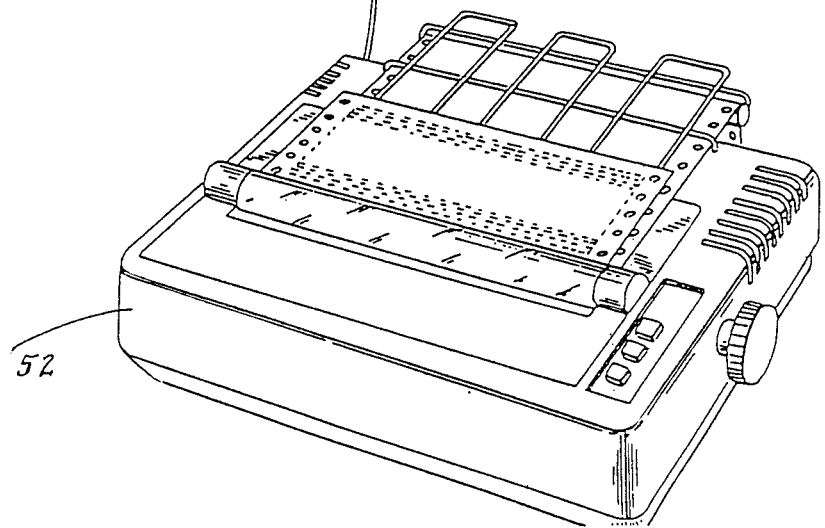

FIG. 5 shows a computer in association with a dot matrix printer, for printing out the data strip. Note that the data strip being printed uses the full width of the printer. The camera used to reduce the printed strip photographically is not shown.

DETAILED DESCRIPTION OF THE INVENTION

Figure 1:
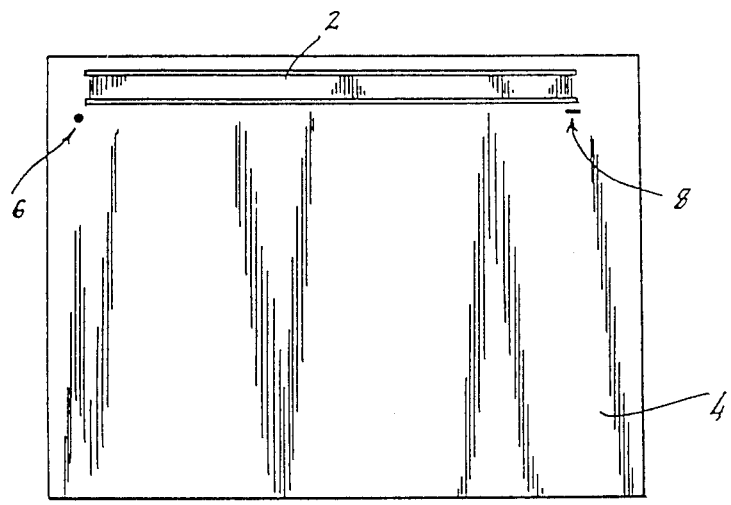

FIG. 1 shows a typical use of a data strip. Here data strip 2 has been printed along the edge of a sheet of paper 4. Data strip alignment marks 6 and 8 have been printed alongside the strip; these are used to align the optical reader 22 with the data strip before reading (scanning) commences. Normally, a standardized optical reader with known operating characteristics and specifications is used.

A typical data strip 2 might be about 16 mm (5/8 inch) wide and about 254 mm (10 inches) long, printed near the edge of a sheet of 216 mm × 280 mm (8½ by 11 inch) paper. Such a strip could include as many as 5850 bytes of information, using our preferred minimum bit size. This means that, depending upon the desired strip size and the total amount of information, the size of the dibits will vary and, often, is extremely small. Each dibit contains two bits; and it is important that these bits be of uniform width and height throughout the information portion of the data strip.

The preferred minimum bit size may be varied depending upon the capabilities of the optical reader and the degree of reliability desired. The minimum bit selected by us provides essentially 100% accuracy in reading with the reader we use. Under some circumstances the use of smaller bit sizes, with lesser accuracy, may be satisfactory for the use being made.

Figure 2:
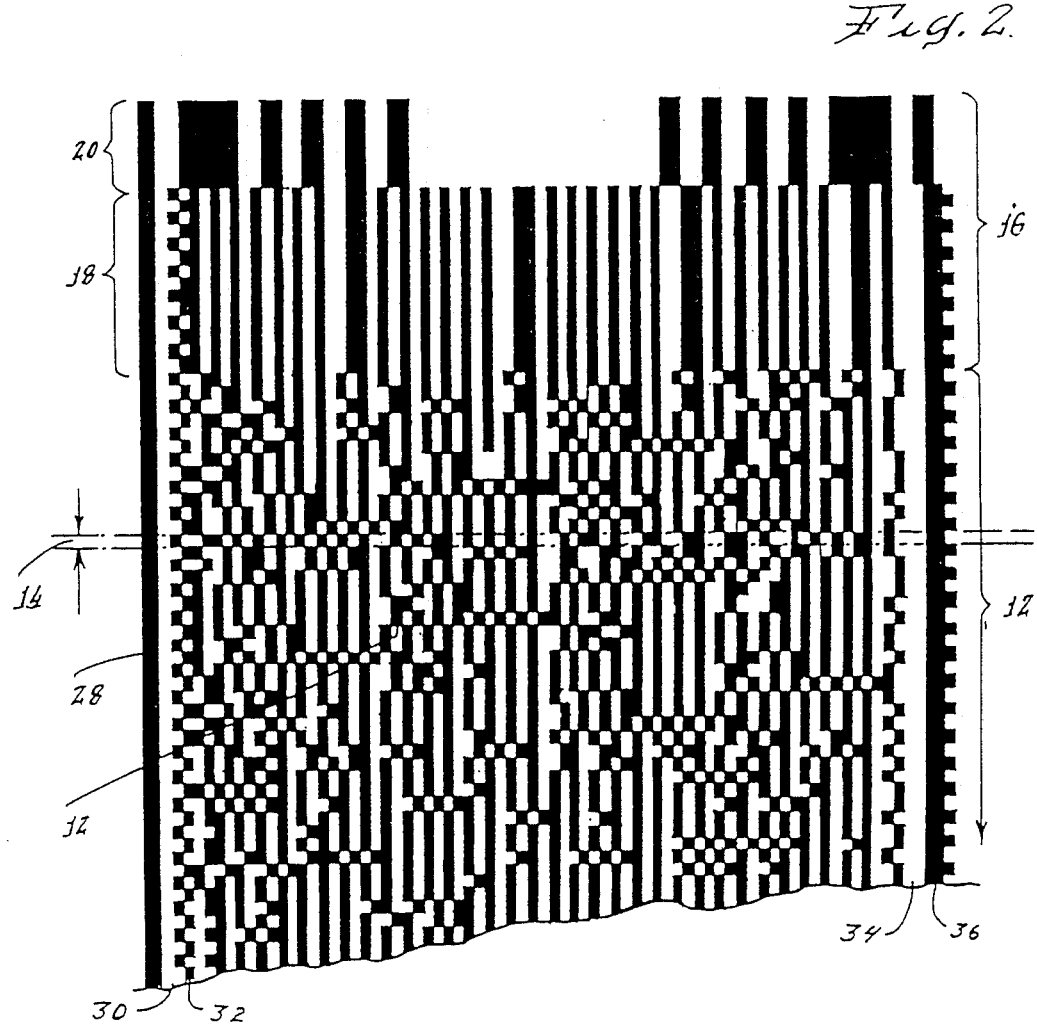
FIG. 2 is a plan view showing the organization of a typical data strip.

FIG. 2 shows an enlarged portion of a data strip 2. It includes information portion 12 made up of a series of data lines 14, each line being made up of a series of uniform dibits. The data lines 14 should also include dibits for dual parity checks of the information dibits and bits to form left and right alignment guides 32 and 36 (see below). Each line should include the same number of bits, and the portion of the line carrying the encoded information should have a fixed number of integral nibbles.

Data strip 2 includes a header 16 preceding, i.e., coming before, information portion 12. Information included in header 16 is used by, and controls, the optical reader 22 during reading (scanning).

Header 16 includes a vertical synchronization section 18 and a horizontal synchronization section 20. These two sections carry encoded information about the characteristics of the data in information portion 12. Vertical synchronization section 18 contains encoded information about the height of the bit areas. Horizontal synchronization section 20 contains encoded information as to the number of bit areas in each line, and alignment data; it also permits the reader to set threshold levels relating to the contrast between paper and ink color. Further details as to the organization of the data strip are given in copending application Ser. No. 779,062, filed Sept. 23, 1985, owned by a common assignee.

The height of the bit areas (width of the data lines) normally ranges from about 0.25 mm to about 1.0 mm (0.010 inch to 0.040 inch); and the width of the bit areas normally ranges from about 0.15 mm to about 0.46 mm (0.006 inch to 0.018 inch). ("Height", as used here, is in a direction longitudinal of the data strip 2, vertical in FIG. 4, and would be the width of a data line 14). Since data is encoded in dibits, i.e., double bits (see copending application), each dibit would have a width double that of the bit. (The use of dibits permits more accurate error detection and parity checking).

High density strips are preferred since they carry more encodable information. Our high density strips, for accurate reading, have dibit areas measuring 0.25 mm high by 0.30 mm wide (0.010 inch by 0.012 inch). This density is used when the strips are made the width of a dot matrix printer and reduced photographically (see below). If the bits are printed directly in their final size by a dot matrix printer, the minimum size may have to be larger, depending upon the capabilities of the specific printer.

By contrast, a low density strip might, for example, have dibit areas 0.50 mm high by 0.76 mm wide (0.020 inch by 0.030 inch).

Data strip 2 has a two-bit wide start line 28, a one-bit space 30, and a two-bit wide "checkerboard-patterned" alignment guide 32 running vertically (longitudinally) along its left edge; and a two-bit wide space 34 and three-bit wide right alignment guide 36 running along its right edge. These are formed of bits in each data line 14 (as more fully described in the aforesaid copending application) and serve to control the optical reader 22.

As can be seen, the variables on each data strip are interdependent and must be correlated in data strip layout in order to produce a resulting data strip which meets the specified format requirements.

Figure 3:
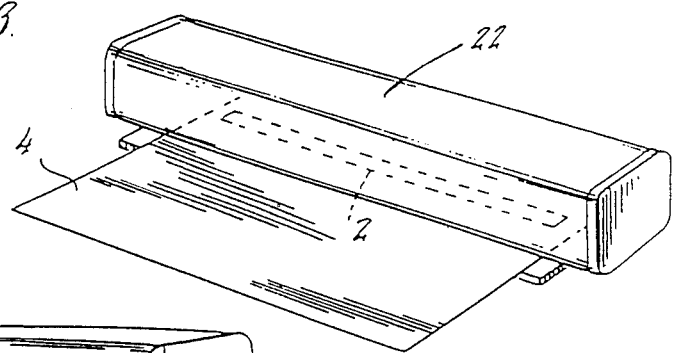
FIG. 3 is a perspective view of an optical reader positioned over a data strip so that the strip may be read (associated computer readout equipment is not shown).

FIG. 3 shows how the data strip 2 is read. The strip, printed on a sheet of paper 4, is positioned below reader 22 so that it can be optically scanned. As mentioned above, the associated computer and readout are not shown.

Figure 4:
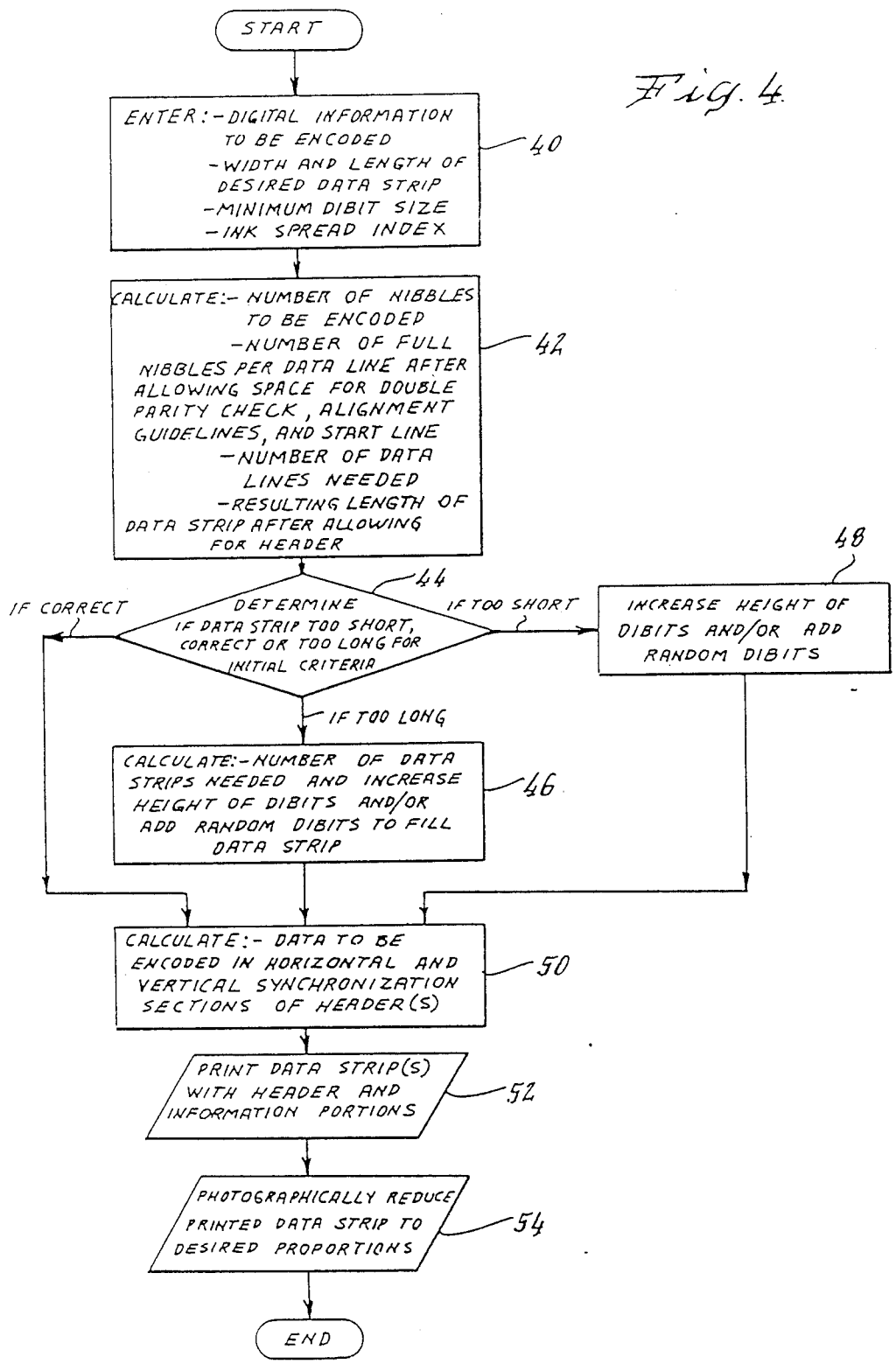
FIG. 4 is a flowchart showing the method of transforming the digital data input into data strip format.

The method used in establishing the parameters of the data strip to be printed, including the information to be encoded in the header, is outlined in the flowchart of FIG. 4.

One starts by obtaining the information to be encoded. This normally is received in digital form on a floppy disk or other data storage means and can then be entered into a data receiving means, such as the input of a computer. However, if the information is in textual form, it may be typed directly into the computer memory system.

It is also necessary to enter into the receiving means the following factors (FIG. 4, box 40):

1. The desired width and length for the data strip;
2. The minimum acceptable (readable) dibit size; and
3. The ink spread index.

The first two of these factors have been previously discussed.

The third factor, the ink spread index, relates to the extent to which the printing ink to be used will bleed into, or spread out onto, the paper and, so, extend the width and height of printed bits. The ink spread index depends upon the type of ink and printing paper to be used, and it must be determined experimentally.

The ink spread index is often measured in inches. It appears to run from about −0.001" to about +0.003". It can be negative when using a very porous paper which results in the ink running very little, not even to the desired edge of the bits. It would be positive if the paper was not porous (glossy), the ink was very fluid, or the printing was done on a poor press. If the index is positive, it flows farther and so the bits in the master should be reduced in size as printed by an amount sufficient to make the final bit of the desired size, and vice-versa.

(It should be noted that the preferred method, that of first printing the data strip in enlarged size on a dot matrix printer and then reducing it in size photographically, is advantageous in that it has little or no ink spread. The ink spread index comes into play primarily when the data strip is produced using actual printing inks to make the strip).

One then calculates (box 42):
1. The number of nibbles in the information to be encoded;
2. The number of full nibbles that can be placed in each data line (of predetermined length) after allowing space for a double parity check, alignment guidelines, and a start line (to the extent used);
3. The number of data lines which will be needed to accommodate the total amount of information to be encoded; and
4. The resulting length of the data strip, after allowing for the length of the header.

From the above, it can be determined (box 44) whether the data strip will be too short, too long, or the originally desired length. If the strip will be too long, it will be necessary to have more than one strip to encode the data. Thus, one determines how many strips are necessary and the extent to which the data will fill that number of strips (box 46). If the last strip will not be filled, it can be shortened, or, preferably, all of the dibits can be increased in height, or height and width (changing horizontal density), so that the strips are full (this increases the accuracy of the scanning, since the dibits are bigger). Alternatively, the last strip can be filled in with random dibits.

If the strip will be too short, the same type of solution is used (box 48). As above, one increases the height, or height and width, of the dibits or adds random dibits to fill the space.

If the determined width of the strip is too narrow, the solution is similar. One widens the dibits until the strip width is correct. This procedure is not shown in FIG. 4, since the procedure is similar to that shown in boxes 44, 46, and 48.

If desired, the calculated parameters for the strip can be displayed on a read-out screen.

The data to be encoded in the vertical synchronization section 18 and the horizontal synchronization section 20, which form the header, must now be determined (box 50). This data can be encoded in any manner consistent with the algorithm of the optical scanner, as set forth in the above-mentioned copending application. The information encoded in the header is used by, and controls, the optical reader 22 during scanning.

If desired, all of the above calculations may be done by the use of appropriate software programs. It can be seen, however, that all of the factors are interdependent and so must be correlated to produce a data strip fitting the specified size criteria and having the proper format.

Once all of the parameters of the data strip 2 are worked out, the data strip is printed (box 52) by the computer which has made the calculations. (If the calculations were not made by computer, the results should first be entered into a computer memory for print-out).

Accuracy is enhanced if the printing is done in a size larger than the desired resulting strip and then the strip is reduced in size. To this end, we have used a dot matrix printer to print out a data strip having the full width of the printer and have then photographed the printout using a scale of reduction such that the resulting negative is of a data strip of the desired final dimensions (box 54).

We have found that a scale of reduction of about 8:1 is satisfactory; but reductions from about 6:1 to about 12:1 can be used depending upon the resolution of the dot matrix printer and the final degree of accuracy desired.

Alternatively, the printing can be done by other means, such as by use of a laser printer or a dot matrix printer capable of printing the final size and still providing sufficient detail.

EXAMPLE

An example may be helpful.

Assume that one desires to have a strip with a total length of 9.5 inches (241 mm) (which after a header of 0.25" would be 9.25" or 235 mm), and a width of 0.66 inch (16.8 mm). Also assume that 4500 bytes of information are to be encoded, equivalent to 9000 nibbles. The ink spread index is +0.001" (0.025 mm). Seeking the maximum density, per the pre-determined criteria, the height of the dibit would be 0.25 mm (0.010"), and its width 0.30 mm (0.012") (0.15 mm per bit in the dibit).

Though the line length is equal to the width of the strip (16.8 mm), the usable line length is only that which is left after subtracting space needed for control and parity checks. This would include, on the left edge, start line 28 (2 bits), space 30 (1 bit), checkerboard 32 (2 bits); and, on the right edge, space 34 (2 bits) and alignment guideline (3 bits), for a total of 10 bits. In addition, 2 dibits (4 bits) are needed per line for parity check. Accordingly, the length of the data line 14 usable for carrying encoded information must be reduced by a total of 14 bits or 7 dibits, making this length 16.8 mm minus 14 times 0.15 mm (the width of a bit) or 16.8−(14 bits×0.15 mm)=14.70 mm.

Since a nibble is 4 dibits wide, a nibble would be 1.20 mm wide. The number of nibbles per data line 14 would, then, be 14.70 mm/1.20 mm or 12.25 nibbles. This means that there will be 12 nibbles possible on each data line (only an integral number of nibbles is used). Consequently, 9000 nibbles would require 9000/12 or 750 lines (any extra space on the last line being filled with random bits). 750 lines, with dibit heights of 0.25 mm (0.010") would create a length of 750 times 0.25 mm or 187.5 mm (7.38"). This is within our desired length of 235 mm (9.25"); and so the space can be filled by adding random bits or by increasing the dibit height, or the length of the strip can be left unchanged. (If aesthetics are not a consideration, maintaining maximum density results in the data strip being read more quickly.)

The dibit height can be increased by the ratio 235 mm/187.5 mm (9.25"/7.38") to increase the strip length to that previously specified. This would give a dibit height to be used of 0.31 mm (0.012"). Accordingly, the dibits will be 0.31 mm (0.012) high, rather than the minimum of 0.25 mm. This will increase the accuracy of the scanning; but the optical reader 22 must have this information.

Turning to the width of the dibits, we now know that each line will have 7 dibits of control and parity data and 12 nibbles of information (12 times 4 or 48 dibits), making a total of 55 dibits. The initially selected dibit width was 0.30 mm, making the resulting line length 55 times 0.30 or 16.5 mm (0.65"). Since the desired line length was 16.8 mm (0.66"), the dibit width could be increased proportionally. However, here, this width change would be nominal and so could be ignored.

The above calculations bring us to the following requirements to meet the desired data strip size of 235 mm high (plus header) and 16.8 mm (0.66") wide:

Dibit height: 0.31 mm (0.022")

Dibit width: 0.30 mm (0.012")
Total number of lines: 750

The above, however, is before determining the effect of the ink spread index. Since the ink will spread on the printed (dark) bits, each printed bit must be reduced in height and width by 0.001" (0.025 mm). Consequently, the bits as printed within each dibit, will be reduced in height by 0.025 mm to 0.285 mm (0.011"), and in width by 0.025 mm to 0.125 mm wide. Note that the final bit size is not changed, only the size as printed; and ink flow in the paper causes the final bit to reach the predetermined size.

The outer edges of the start line 28 and guidelines 30 and 32 will likewise be reduced, but the heights need to be adjusted only where the line has discontinuous portions. It is best to have no longitudinal discontinuities in start line 28 and the solid portion of right alignment guide 36.

We prefer a standardized optical reader designed to receive integral nibbles. If, however the reader is designed to use words, bytes, double dibits, or simply dibits as the integral unit on each line, the above calculations would be changed accordingly.

It is sometimes useful to include other data on the data strip, in addition to that being encoded; if so, once again, the calculations should be adjusted for this.

Data as to the final format should then be incorporated in the header format, as above described.

From the above description, the nature of the apparatus required to transform the original information to data strip form becomes clear. One needs an apparatus which has some form of receiving and storage means for receiving and storing (a) the information to be encoded upon the data strip, (b) the desired dimensions of the proposed resulting data strip, (c) the desired minimum dibit size, (d) the ink spread index, and (e) the reduction factor if photographic reduction is to be used. This can be a computer programmed to receive and store such information. If so, the computer should have software to carry out all of the calculations and determinations set forth above, particularly those described in conjunction with the description of the flowchart of FIG. 4 and as given in the example; and a printer should be operatively associated with the computer for producing the strips themselves. As stated, the printer will preferably print out an enlarged data strip which is then photographically reduced.

We claim:

1. The method of transforming data stored in a digital memory of a computer system into a printed data strip having a data portion encoded in multiple data lines containing double bits or dibits of information and a header, said printed strip conforming to predetermined dimensional criteria and optical reader operating system specifications, said method including
    (a) Determining:
        (1) The minimum acceptable height and width of said dibits,
        (2) The number of nibbles of data or the desired multiple-dibit integral unit size to be used by said reader and the number of said units of data in said stored data, and
        (3) The desired width and height of the proposed said data strip,
    (b) Calculating the maximum number of nibbles or said integral units that can fit on a data line within said dimensional criteria and the resulting total number of data lines needed to encode said stored data in said proposed printed data strip,
    (c) Increasing the size of said double bits or dibits as required to cause the resulting said printed data strip to meet said dimensional criteria,
    (d) Formatting a header for said proposed printed data strip which contains computer-readable information disclosing the height and width of double bits or dibits used in said data lines, and the number of said nibbles or said integral units per line; and
    (e) Outputting said data strip including said header and said data portion in the above-determined format.

2. The method of transforming stored data as set forth in claim 1 including the steps of initially printing said data strip in a size larger than said predetermined dimensional criteria and thereafter photographically reducing said printed data strip to make its dimensions conform to said predetermined dimensional criteria for said data strip.

3. The method of transforming stored data as set forth in claim 1 including the step of increasing the size of said dibits by increasing the height thereof.

4. The method of transforming stored data as set forth in claim 1 including adjusting the size of bits in said dibits, before printing to allow for ink spread.

5. The method of transforming data stored in a digital memory of a computer system in a printed data strip having a data portion encoded in multiple data lines containing double bits or dibits of information and a header, said strip conforming to predetermined dimensional criteria and optical reader operating system specifications, said method including
    (a) Determining:
        (1) The minimum acceptable height and width of said dibits,
        (2) The number of nibbles of data to be used by said reader and the number of units of data in said stored data, and
        (3) The desired width and height of the proposed said printed data strip,
    (b) Calculating the maximum number of nibbles that can fit on a data line within said dimensional criteria and the resulting total number of data lines needed to encode said stored data in said proposed printed data strip,
    (c) Increasing the size of said double bits or dibits as required to cause the resulting said printed data strip to meet said dimensional criteria,
    (d) Formatting a header for said proposed data strip which contains computer-readable information disclosing the height and width of double bits or dibits used in said data lines, and the number of said nibbles per line; and
    (e) outputting said printed data strip including said header and said data portion in the above-determined format.

6. The method of transforming data stored in a digital memory of a computer system in a printed data strip having a data portion encoded in multiple data lines containing double bits or dibits of information and a header, said strip conforming to predetermined width criteria and optical reader operating system specifications, said method including
    (a) Determining:
        (1) The minimum acceptable width of said dibits, (2) The number of nibbles of data to be used by said reader and the number of units of data in said stored data, and (3) The desired width and height of the proposed said printed data strip, (b) Calculating the maximum number of nibbles that can fit on a data line within said dimensional criteria and the resulting total number of data lines needed to encode said stored data in said proposed printed data strip, (c) Increasing the size of said double bits or dibits as required to cause the resulting said printed data strip to meet said width criteria, (d) Formatting a header for said proposed data strip which contains computer-readable information disclosing the height and width of double bits or dibits used in said data lines, and the number of said nibbles per line; and (e) outputting said printed data strip including said header and said data portion in the above-determined format.

7. The method of transforming stored data as set forth in claim 6 including the steps of initially printing said data strip in a size larger than said predetermined dimensional criteria and thereafter photographically reducing said printed data strip to make its dimensions conform to said predetermined dimensional criteria for said data strip.

8. The method of transforming stored data as set forth in claim 6 including the step of increasing the size of said dibits by increasing the height thereof.

9. The method of transforming stored data as set forth in claim 6 including adjusting the size of bits in said dibits, before printing, to allow for ink spread.

10. The method of transforming data stored in a digital memory of a computer system into a printed data strip having a data portion encoded in multiple data lines containing double bits or dibits of information and a header, said printed strip conforming to predetermined width criteria and optical reader operating system specifications, said method including (a) Determining:

(1) The minimum acceptable width of said dibits, (2) The number of multiple-dibit integral in said stored data, and (3) The desired width of the proposed said data strip, (b) Calculating the maximum number of said integral units that can fit on a data line within said width criteria and the resulting total number of data lines needed to encode said stored data in said proposed printed data strip, (c) Increasing the size of said double bits or dibits as required to cause the resulting said printed data strip to meet said width criteria, (d) Formatting a header for said proposed printed data strip which contains computer-readable information disclosing the height and width of double bits or dibits used in said data lines, and the number of said integral units per line; and (e) Outputting said data strip including said header and said data portion in the above-determined format.

* * * * *